C. G. Sargent.
Cotton Gin.
N° 89,890.   Patented May 11, 1869.

Witnesses,
P. T. Dodge
H. B. Munn

Inventor,
C. G. Sargent,
By A. B. Ely

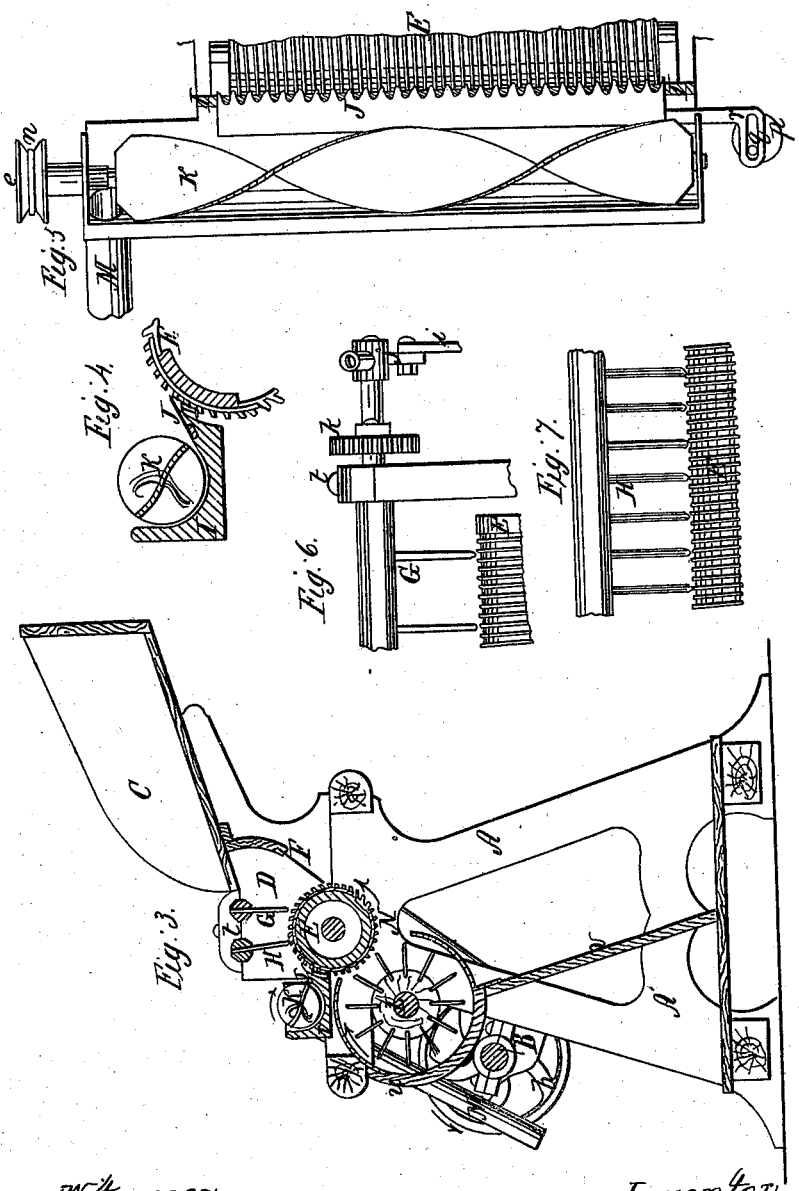

United States Patent Office.

CHARLES G. SARGENT, OF WESTFORD, MASSACHUSETTS.

Letters Patent No. 89,890, dated May 11, 1869.

IMPROVEMENT IN COTTON-GINS.

The Schedule referred to in these Letters Patent and making part of the same.

Be it known that I, CHARLES G. SARGENT, of Westford, Middlesex county, Massachusetts, have invented certain new and useful Improvements in Cotton-Gins, of which the following, with the drawings, is a full description.

Figure 3 is a sectional end elevation of fig. 1.

Figure 4 is a section of stationary shell-guard, vibrating fingers, worm, and part of ginning-cylinder.

Figure 5 is a top view of fig. 4, showing crank-pin motion.

Figures 6 and 7 are views of fine and coarse rakes and ginning-cylinder.

Figure 2:
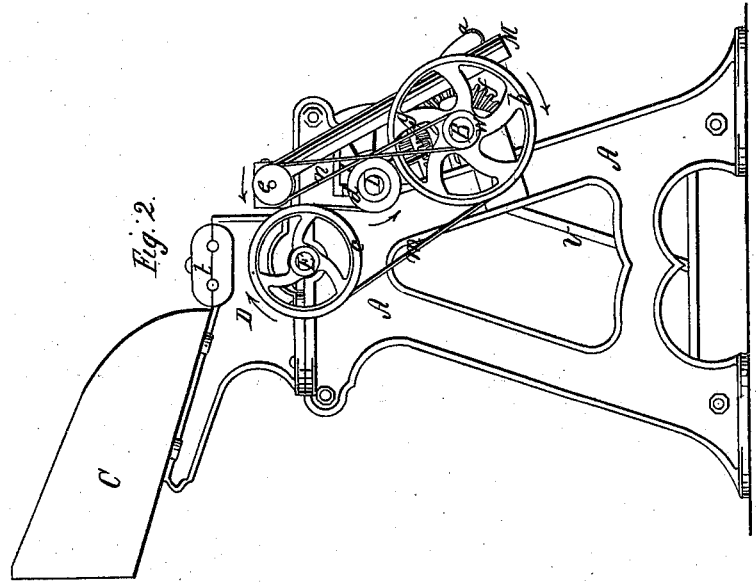
Figures 1 and 2 are right and left-hand end elevations.
Figure 1:
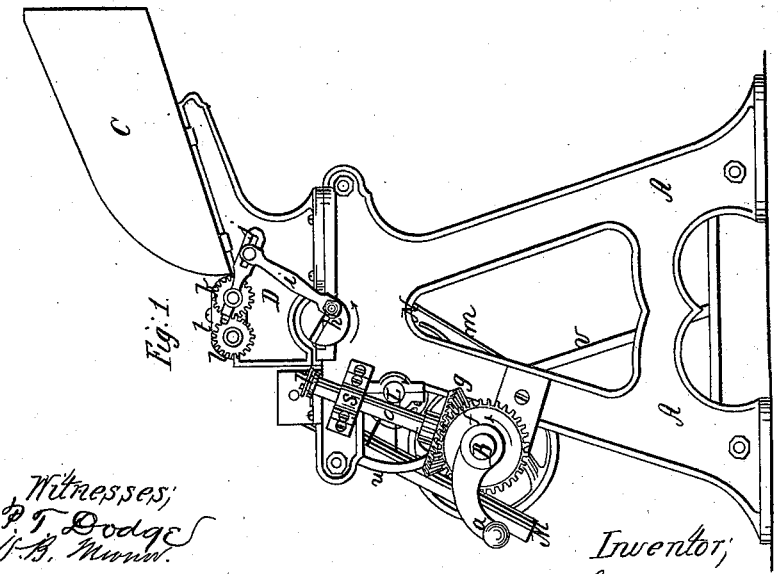

A A is the main frame.

B, the main shaft, with crank-handle $a$.

C, receptacle for the unginned cotton.

D, the hopper.

E, the toothed or ginning-cylinder.

F, a grate or pins, forming rear bottom of hopper.

G, the first oscillating rake.

H, the second oscillating rake.

I is a stationary shell-guard, having on its edge a strip of raw hide, I.

J is a reciprocating toothed comb, or finger-bar.

K is a screw-worm, with broad blade running in the trough of the shell-guard in rear of the reciprocating bar.

L is a brush-cylinder.

M, a spout from the worm-trough.

N, an opening in the casing of the brush-cylinder.

$b$ is a pulley on the outer end of the main shaft.

$c$ is a pulley on the outer end of the shaft of the burring-cylinder.

$d$ is a pulley on the outer end of the shaft of the brush-cylinder.

$w$ is a small pulley also on the outer end of the main shaft.

$e$ is a pulley on the outer end of the worm-shaft.

$f$ is a gear (bevelled) on the crank end of the main shaft.

$g$ is another bevelled-gear wheel, meshing into $f$, and having a shaft, $o$, passing through a box, $s$, and having, upon its upper end, a crank-pin, $p$, taking into a slot, $q$, at right angles to a rod, $r$, attached to the comb or finger-bar J.

$i$ is a rod or lever, attached at one end to a variable crank-pin, $h$, on the end of the shaft of the toothed or ginning-cylinder E, and at the other, to the slotted rod $j$, which is attached to the end of the shaft of the oscillating rake G.

$k$ is a gear-wheel on the end of the shaft of rake G, and meshing into gear-wheel $l$ on the end of shaft of rake H, which shafts run in boxes $t$.

$m$ is a band passing round pulleys $b$ and $c$, and under pulley $d$.

$n$ is a band passing round pulleys $w$ and $e$.

$u$ is the casing of brush-cylinder, and $v$, apron.

By turning the crank, motion is imparted to the burring-cylinder and brush-cylinder by means of band $m$, and to the worm by means of band $n$.

Motion is imparted from shaft of burring-cylinder, by means of lever $i j$, to the oscillating rakes G and H.

Motion is imparted from the main shaft, by means of bevelled gears $f$ and $g$, shaft $o$, crank-pin and slot and rod $p$, $q$, and $r$, to the vibrating comb or finger-bar J.

The operation is as follows:

The seed-cotton, or other fibre, with its foreign matter, is placed in its receptacle C, and from there pushed or dropped in small quantities into the hopper and upon the surface of the ginning-cylinder, which may be a fine-toothed or roughened surface, as shown.

The surface of the cylinder seizes on the fibre, and carries it and its seed forward to the first oscillating rake, whose teeth are far enough apart to allow a seed and its fibre to pass.

A portion of the fibre is carried on through the teeth of the rake, the rest is thrown back, and the whole prevented from clogging, by the action of the rake, until it is broken up or separated, and passed through the first rake.

When seed and fibre pass the first rake, they are carried forward to the stationary shell-guard, which has a working-edge of raw hide, or other partially-elastic substance, which can be set so close as to impinge on the surface of the ginning-cylinder without injury. Here the fibre is drawn between the stationary shell-guard and the surface of the cylinder.

To facilitate the work, the vibrating comb or finger-bar, which is placed just above the guard-edge, plays back and forth, and turns the seed over and around, so that all its sides come in contact with the ginning-surface, and its fibre is entirely stripped off. This operation is also facilitated by the oscillating motion of the second rake, whose teeth are set apart sufficiently to allow a cotton-seed divested of fibre to pass through, and which, tossing the seeds and fibre back until the fibre is all cleaned off, allow the seeds to pass through into the trough on the back of the stationary shell-guard, within reach of the blades of the worm. By this worm the seeds are passed along to the spout and fall out.

The fibre being drawn forward and downward by the ginning-cylinder until it reaches the brush-cylinder, is brushed off and thrown out.

What I claim, is—

1. The raw hide, or partially-elastic working-edge of a stationary guard, in combination with a ginning or cleaning-cylinder, substantially as described.

2. The reciprocating comb or finger-bar in combination with a stationary guard and ginning or cleaning-cylinder, the whole constructed to operate substantially as described.

3. The combination of one or more oscillating rakes with a ginning or cleaning-cylinder, substantially as described.

In testimony whereof, I have hereunto subscribed my name.

CHAS. G. SARGENT.

Witnesses:
A. H. CARYL,
H. W. B. WIGHTMAN.